Patented Aug. 28, 1951

2,565,592

UNITED STATES PATENT OFFICE 2,565,592

3-HYDROXY-4,4-DIPHENYL-6-AMINOHEPTANES

Robert L. Clark, Woodbridge, N. J., assignor to Merck & Co., Inc., Rahway, N. J., a corporation of New Jersey No Drawing. Original application February 27, 1948, Serial No. 11,831. Divided and this application March 10, 1950, Serial No. 149,031

5 Claims. (Cl. 260—247.7)

This invention relates to the preparation of new compounds characterized by analgesic properties. More particularly, it relates to compounds such as 3-hydroxy-4,4-diphenyl-6-diakylaminoalkanes, 3-hydroxy - 4,4 - diphenyl-6-morpholinoalkanes, acylated 3-hydroxy-4,4-diphenyl-6-dialkylaminoalkanes, acylated 3 - hydroxy-4,4-diphenyl-6-morpholinoalkanes and the like, their salts and to methods for their preparation. These new products useful as analgesics, and as substitutes for morphine, can be represented by the following general formula:

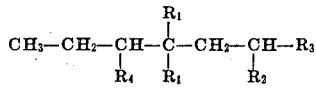

wherein $R_1$ is a phenyl group, $R_2$ is a radical selected from the group consisting of aliphatic amino, aromatic amino and heterocyclic amino, $R_3$ is selected from the group consisting of hydrogen and alkyl, $R_4$ is a radical selected from the group consisting of OH and O-acyl.

This application is a division of application Serial No. 11,831, filed February 27, 1948.

It is well known that compounds such as 4,4-diphenyl-6-dimethylamino-3-heptanone (amidone) are potent analgesics. Amidone was developed in Germany and is described in the Department of Commerce (office of the Publication Board) Report OPB 981 dated July 1945.

I have now found that 3-hydroxy-4,4-diphenyl-6-dialkylaminoalkanes and acylated 3-hydroxy-4,4 - diphenyl - 6 - dialkylaminoalkanes possess analgesic properties superior to amidone. For example, 3 - hydroxy-4,4-diphenyl-6-dimethylaminoheptane has its maximum analgesic effect three hours after injection, whereas in the case of amidone the effect usually begins to wear off after one hour. Also, the compound 3-acetoxy-4,4-diphenyl-6-dimethyltminoheptane is a more potent analgesic than the corresponding 3-ketone. Thus the 3-hydroxy - 4,4 - diphenyl-6-dialkylaminoalkanes and the acylated 3-hydroxy-4,4-diphenyl-6-dialkylaminoalkanes constitute new and important analgesics which can be used as substitutes of morphine. These compounds excel amidone in many respects in that they are less toxic and display more potent analgesic properties.

In the preparation of these compounds in accordance with my invention herein disclosed, ketones such as 4,4-diphenyl-6-dimethylamino-3-heptanone, 4,4-diphenyl-6-morpholino-3-hexanone or the like are first subjected to hydrogenation. The hydrogenation may be carried out at room temperature in the presence of a suitable catalyst such as platinum oxide at a pressure of approximately 40 lbs. of hydrogen. Alternatively, the hydrogenation can be accomplished in about 30 minutes, with the use of high temperatures and pressures preferably in the presence of Raney nickel. An ether solution of lithium aluminum hydride also produces the hydrogenation. The keto group is thereby reduced to form a secondary alcohol group in the 3 position.

My invention concerns the preparation of these substituted alcohols which possess analgesic properties and are important intermediates in the preparation of acylated compounds which also possess analgesic properties.

The acylated compounds of my invention may be prepared by refluxing secondary alcohols such as 3-hydroxy - 4,4 - diphenyl-6-dimethylaminoheptane, 3 - hydroxy-4,4-diphenyl-6-morpholino hexane or the like, preferably in the form of their hydrohalide salts, with an acylating agent. Suitable acylating agents are for example acetic anhydride, propionyl chloride, 4-nitrobenzoyl chloride, formic-acetic anhydride, and the like. It is usually preferred to use a large excess of the acylating agent. When using 4-nitrobenzoyl chloride as the acylating agent the 3(4'-nitrobenzoxy)-4,4-diphenyl compound is formed. This compound may be further reduced to form the 3(4'-aminobenzoxy) derivative, which compound may in turn be acylated to form a 3(4'-acylaminobenzoxy)4'4-diphenyl alkane.

The following examples illustrate methods of carrying out the present invention, but it is to be understood that these examples are given by way of illustration and not of limitation.

EXAMPLE 1

*3-hydroxy-4,4-diphenyl-6-dimethylaminoheptane*

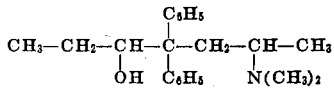

A solution of 3.46 g. of 4,4-diphenyl-6-dimethylamino-3-heptanone hydrochloride in 100 ml. of water was hydrogenated at 40 lbs. pressure of hydrogen at room temperature in the presence of 0.2 g. of platinum oxide. A small excess of hydrogen was absorbed. The catalyst was removed by filtration and the solvent removed in vacuo leaving 3 g. of 3-hydroxy-4,4-diphenyl-6-dimethylaminoheptane hydrochloride which was crystallized from methanol-ether; M. P. 191–192°.

Anal. calcd. for $C_{21}H_{29}ONCl \cdot HCl$: C, 72.49; H, 8.69; N, 4.03. Found: C, 72.23; H, 8.53; N, 3.96.

EXAMPLE 2

*3-hydroxy-4,4-diphenyl-6-dimethylaminoheptane*

A solution of 6.2 g. of 4,4-diphenyl-6-dimethylamino-3-heptanone in 140 ml. of methanol was heated to 185° for 30 minutes at 2000 lbs. pressure of hydrogen in the presence of 3 g. of Raney nickel. The nickel was removed and the solvents distilled in vacuo. The remaining oil (6 g.) was dissolved in 150 ml. of ether and an excess of dry hydrogen chloride was passed into the solution. The hydrochloride of 3-hydroxy-4,4-diphenyl-6-dimethylaminoheptane could be crystallized from ethanol-ether.

EXAMPLE 3

*3-hydroxy-4,4-diphenyl-6-dimethylaminoheptane*

In a flask equipped with an addition funnel, a condenser and a stirrer was placed a solution of 1.3 g. of lithium aluminum hydride in 50 ml. of ether. An ether solution of 9 g. of 4,4-diphenyl-6-dimethylamino-3-heptanone in 50 ml. of ether was added slowly. After fifteen minutes 5 ml. of water was added cautiously followed by 30 ml. of 2.5 N hydrochloric acid and 20 ml. of concentrated hydrochloric acid. Two clear liquid phases were present. After one hour the product had crystallized from the aqueous phase. This was removed by filtration and dissolved in 20 ml. of hot water. Upon cooling, filtering, and drying, 8.8 g. of white solid was obtained. This was crystallized from 25 ml. of ethanol by the addition of 200 ml. of ether to yield 8 g. of 3-hydroxy-4,4-diphenyl-6-dimethylaminoheptane hydrochloride, M. P. 189–190° C.

EXAMPLE 4

*3-acetoxy-4,4-diphenyl-6-dimethylaminoheptane*

$$CH_3-CH_2-CH-\underset{\underset{OCOCH_3}{|}}{\overset{\overset{C_6H_5}{|}}{C}}-CH_2-\underset{N(CH_3)_2}{\overset{|}{CH}}-CH_3$$

0.8 g. of 3-hydroxy-4,4-diphenyl-6-dimethylaminoheptane hydrochloride was heated to refluxing temperature with 10 times its weight of acetic anhydride for 1 hour. The solvents were removed in vacuo and 0.6 g. of 3-acetoxy-4,4-diphenyl-6-dimethyl-aminoheptane hydrochloride crystallized from ethanol-ether; M. P. 208–209°.

Anal. calcd. for $C_{23}H_{31}O_2N \cdot HCl$: C, 70.84; H, 8.27; N, 3.59. Found: C, 70.55; H, 8.18; N, 3.59.

EXAMPLE 5

*3-propionoxy-4,4-diphenyl-6-dimethylaminoheptane*

$$CH_3-CH_2-CH-\underset{\underset{OCOCH_2CH_3}{|}}{\overset{\overset{C_6H_5}{|}}{C}}-CH_2-\underset{N(CH_3)_2}{\overset{|}{CH}}-CH_3$$

2 g. of the 3-hydroxy-heptane hydrochloride obtained in accordance with Example 1, 2 or 3 was heated to refluxing with 8 times its weight of propionyl chloride (15 ml.) for 1 hour. The solvents were removed and 2 g. of an oil (3-propionoxy-4,4-diphenyl-6-dimethylaminoheptane HCl) was obtained, which crystallized from ethanol-ether; M. P. 185°.

Anal. calcd. for $C_{24}H_{33}NO_2 \cdot HCl$: C, 71.35; H, 8.48; N, 3.47. Found: C, 70.79; H, 7.91; N, 3.71.

EXAMPLE 6

*3-formoxy-4,4-diphenyl-6-dimethylaminoheptane*

$$CH_3-CH_2-CH-\underset{\underset{O-COH}{|}}{\overset{\overset{C_6H_5}{|}}{C}}-CH_2-\underset{N(CH_3)_2}{\overset{|}{CH}}-CH_3$$

Three grams of the 3-hydroxy heptane hydrochloride obtained in accordance with Example 1, 2 or 3 was heated to reflux temperature with 11 g. of formic-acetic anhydride for one hour. The solvents were removed leaving 3 g. of an oil. This was triturated with ether to yield 2 g. of a solid which was crystallized from alcohol-ether and water to give 1.0 g. of 3-formoxy-4,4-diphenyl-6-dimethylaminoheptane hydrochloride dihydrate, M. P. 115–120°.

Anal. calcd. for $C_{22}H_{29}NO_2 \cdot 2H_2O \cdot HCl$: C, 64.14; H, 8.32; N, 3.40. Found: C, 64.78; H, 8.31; N, 3.55.

EXAMPLE 7

*3-hydroxy-4,4-diphenyl-6-morpholinoheptane*

$$CH_3-CH_2-CH-\underset{\underset{OH}{|}}{\overset{\overset{C_6H_5}{|}}{C}}-CH_2-\underset{N}{\overset{|}{CH}}-CH_3$$

A solution of 2.16 g. of 4,4-diphenyl-6-morpholino-3-heptanone hydrobromide in 100 ml. of methanol was hydrogenated at 40 lbs. pressure of hydrogen at room temperature in the presence of 100 mg. of platinum oxide. After the catalyst was removed by filtration, the solvents were distilled in vacuo and the residue, 2 g. of 3-hydroxy-4,4-diphenyl-6-morpholino-heptane hydrobromide crystallized from ethanol-ether; M. P. 221°.

Anal. calcd. for $C_{23}H_{32}NO_2Br$: C, 63.59; H, 7.43; N, 3.23. Found: C, 64.59; H, 7.17; N, 3.29.

EXAMPLE 8

*3-acetoxy-4,4-diphenyl-6-morpholinoheptane*

$$CH_3-CH_2-CH-\underset{\underset{OCOCH_3}{|}}{\overset{\overset{C_6H_5}{|}}{C}}-CH_2-\underset{N}{\overset{|}{CH}}-CH_3$$

1 gram of 3-hydroxy-4,4-diphenyl-6-morpholinoheptane hydrobromide was heated to reflux temperature with 10 times its weight of acetic anhydride for 1 hour. The solvents were removed and the residue (0.5 g.) of 3-acetoxy-4,4-diphenyl-6-morpholinoheptane hydrobromide crystallized from ethanol-ether; M. P. 223°.

Anal. calcd. for $C_{25}H_{34}NO_3Br$: C, 63.02; H, 7.19; N, 2.94. Found: C, 63.31; H, 7.32; N, 3.07.

EXAMPLE 9

*3-propionoxy-4,4-diphenyl-6-morpholinoheptane*

$$CH_3-CH_2-CH-\underset{\underset{OCOCH_2CH_3}{|}}{\overset{\overset{C_6H_5}{|}}{C}}-CH_2-\underset{N}{\overset{|}{CH}}-CH_3$$

1.5 g. of 3-hydroxy-4,4-diphenyl-6-morpholino-heptane hydrobromide was heated heated to reflux temperature with 10 times its weight of propionyl chloride for one and one-half hours. The solvents were removed and the residue (1.2 g.) of 3-propionoxy-4,4-diphenyl-6-morpholino-heptane hydrobromide crystallized from ethanol: M. P. 120–5° (previous softening).

Anal. calcd. for $C_{26}H_{35}NO_3 \cdot HBr$: C, 63.67; H, 7.40; N, 2.86. Found: C, 64.19; H, 7.59; N, 2.77.

EXAMPLE 10

3-acetoxy-4,4-diphenyl-6-morpholinohexane

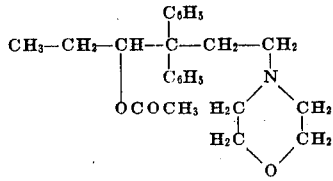

3.6 g. of 4,4-diphenyl-6-morpholino-3-hexanone was dissolved in 75 ml. of methanol and heated to 185° and 2000 lbs. pressure of hydrogen in the presence of 2 g. of Raney nickel. The catalyst was removed by filtration and the solvents removed in vacuo. The product (3.5 g.) of 3 - hydroxy-4,4-diphenyl-6-morpholinohexane was a viscous gum as well as its hydrochloride.

3.5 g. of 3-hydroxy-4,4-diphenyl-6-morpholino-hexane hydrochloride was heated with 10 times its weight of acetic anhydride for 1 hour. The solvents were removed and the residue (1.5 g.) of 3 - acetoxy-4,4-diphenyl-6-morpholinohexane hydrochloride crystallized from methanol-ether; M. P. 242–243°.

Anal. calcd. for $C_{24}H_{31}NO_3 \cdot HCl$: C, 68.96; H, 7.72; N, 3.35. Found: C, 69.04; H, 7.66; N, 3.54.

EXAMPLE 11

3(4'-nitrobenzoxy)-4,4-diphenyl-6-dimethyl-aminoheptane

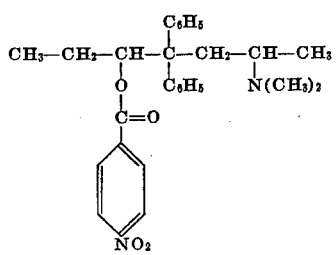

To a mixture of 1.8 g. of 3-hydroxy-4,4-diphenyl-6-dimethylaminoheptane hydrochloride, 50 ml. of water, 1.6 g. of sodium bicarbonate and 50 ml. of ether was added a solution of 1.85 g. of 4-nitrobenzoyl chloride in 50 ml. of ether. The mixture was stirred mechanically for 1½ hours and then allowed to stand 18 hours. The solid at the interface was removed by filtration and shown to be 4-nitrobenzoic anhydride. The ether layer was dried and dry hydrogen chloride passed into it until there was no further precipitation of a gum. This gum, weighing 1.8 g., was dissolved in 25 ml. methanol, 10 ml. of benzene added and the solution evaporated to dryness. This residue was dissolved in 25 ml. of methanol and upon the addition of 100 ml. of ether 1.5 g. of crystals of 3(4'-nitrobenzoxy)-4,4-diphenyl-6-dimethyl-aminoheptane hydrochloride separated (M. P. 223–224°).

Anal. calcd. for $C_{28}H_{32}N_2O_4 \cdot HCl$: C, 67.66; H, 6.69; N, 5.64. Found: C, 67.39; H, 7.06; N, 5.57.

EXAMPLE 12

3(4' - aminobenzoxy) - 4,4-diphenyl-6-dimethyl-aminoheptane

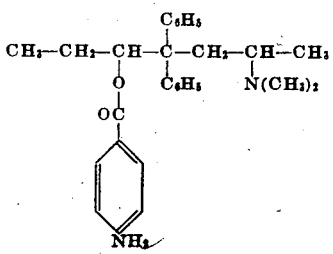

6.5 g. of 3(4'-nitrobenzoxy)-4,4-diphenyl-6-dimethylaminoheptane hydrochloride was suspended in 50 ml. of water, an excess of sodium hydroxide was added and the free base was extracted into ether. The ether was removed in vacuo and the 6 g. residue was dissolved in 100 ml. of methanol and hydrogenated at 40 lbs. pressure of hydrogen in the presence of 5 g. of Raney nickel. The catalyst was removed by filtration. The residue (5.5 g.) was dissolved in 200 ml. of ether and excess dry hydrogen chloride was passed into the solution precipitating the 3-aminobenzoxy compound as a hygroscopic solid. This solid was dried by dissolving it in 30 ml. of absolute ethanol, 10 ml. of benzene was added and the solution evaporated to dryness in vacuo. The residue was dissolved in 15 ml. of warm absolute ethanol and upon cooling 3.5 g. of 3(4'-aminobenzoxy)-4,4-diphenyl-6-dimethylaminoheptane dihydrochloride crystallized. (M. P. 188–189°).

Anal. calcd. for $C_{28}H_{34}N_2O_2 \cdot 2HCl$: C, 66.79; H, 7.21; N, 5.57. Found: C, 67.12; H, 7.79; N, 6.05.

EXAMPLE 13

3(4' - acetoaminobenzoxy) - 4,4 - diphenyl-6-di-methylaminoheptane

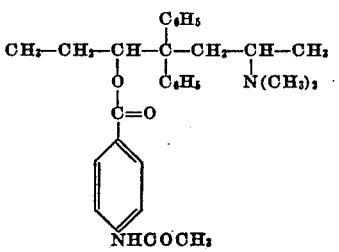

1 g. of 3(4'-aminobenzoxy)-4,4-diphenyl-6-dimethylaminoheptane hydrochloride was heated to reflux temperature with 10 ml. of acetic anhydride for 1 hour. The solvents were removed in vacuo and the residue (1 g.) was dissolved in 5 ml. of absolute ethanol and 50 ml. of ether was added to yield upon cooling 0.75 g. of crystals of 3(4'-acetaminobenzoxy)-4,4-diphenyl-6-dimethylamino-heptane hydrochloride hydrate, (M. P. 178–180° C.).

Anal. calcd. for $C_{30}H_{36}N_2O_3 \cdot HCl \cdot H_2O$: C, 68.36; H, 7.46; N, 5.32. Found: C, 68.20, 68.36; H, 7.48, 7.77; N, 5.42.

Modifications may be made in carrying out the present invention without departing from the spirit and scope thereof, and the invention is to be limited only by the appended claims.

I claim:

1. The compound of the group consisting of alcohols having the formula:

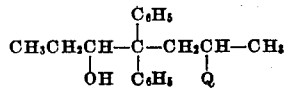

wherein Q is a basic radical selected from the group consisting of dimethylamino and morpholino radicals; and hydrohalide salts thereof.

2. 3-hydroxy-4,4-diphenyl-6-dimethylamino-heptane.

3. 3-hydroxy-4,4-diphenyl-6-morpholinoheptane.

4. 3-hydroxy-4,4-diphenyl-6-dimethylamino-heptane hydrochloride.

5. 3-hydroxy-4,4-diphenyl-6-morpholinoheptane hydrobromide.

ROBERT L. CLARK.

REFERENCES CITED

The following references are of record in the file of this patent:

UNITED STATES PATENTS

| Number | Name | Date |
|---|---|---|
| 2,368,073 | Tryon | Jan. 23, 1945 |
| 2,431,285 | Suter et al. | Nov. 18, 1947 |
| 2,477,842 | Wenner | Aug. 2, 1949 |